Nov. 1, 1927.

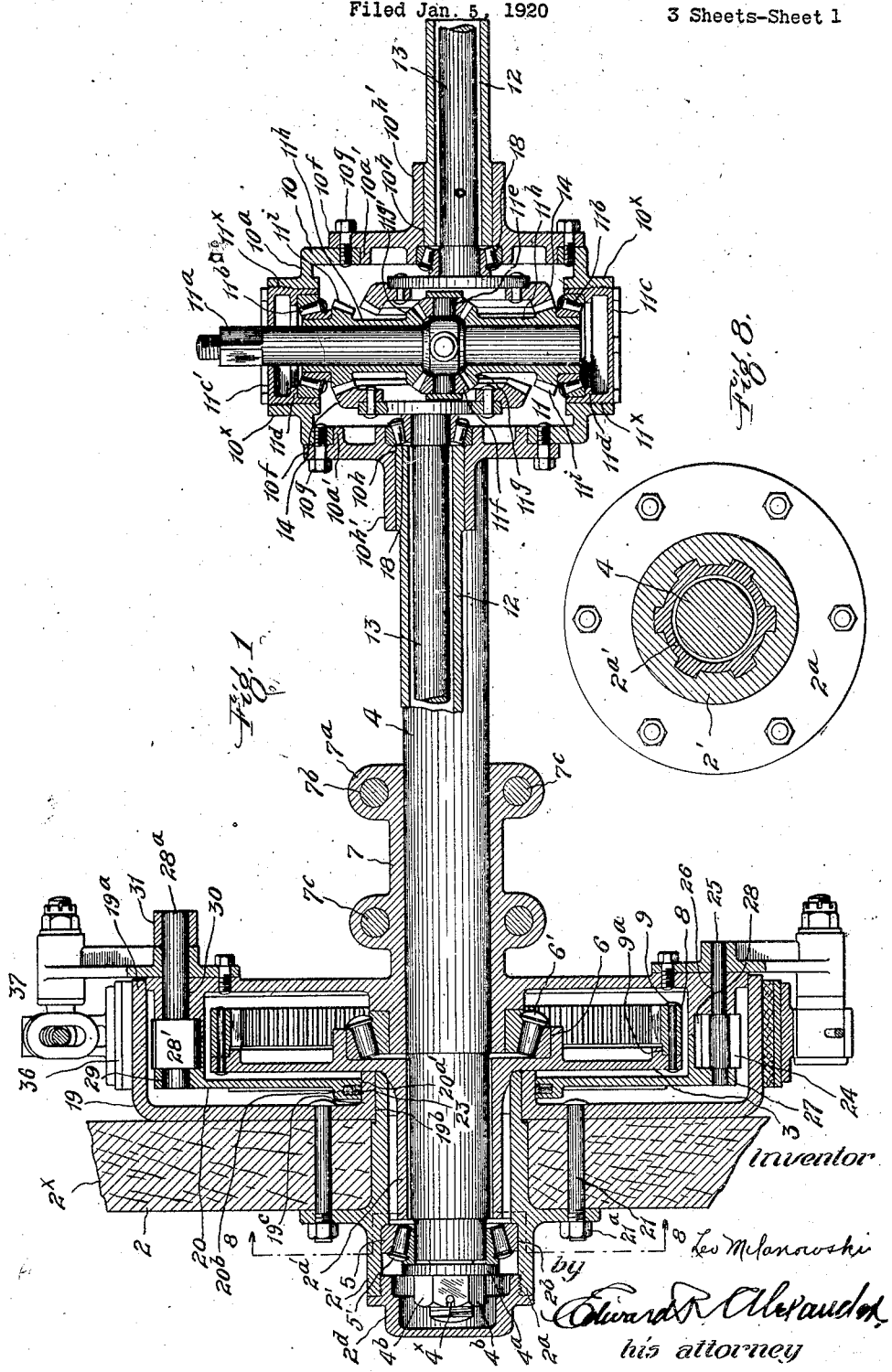

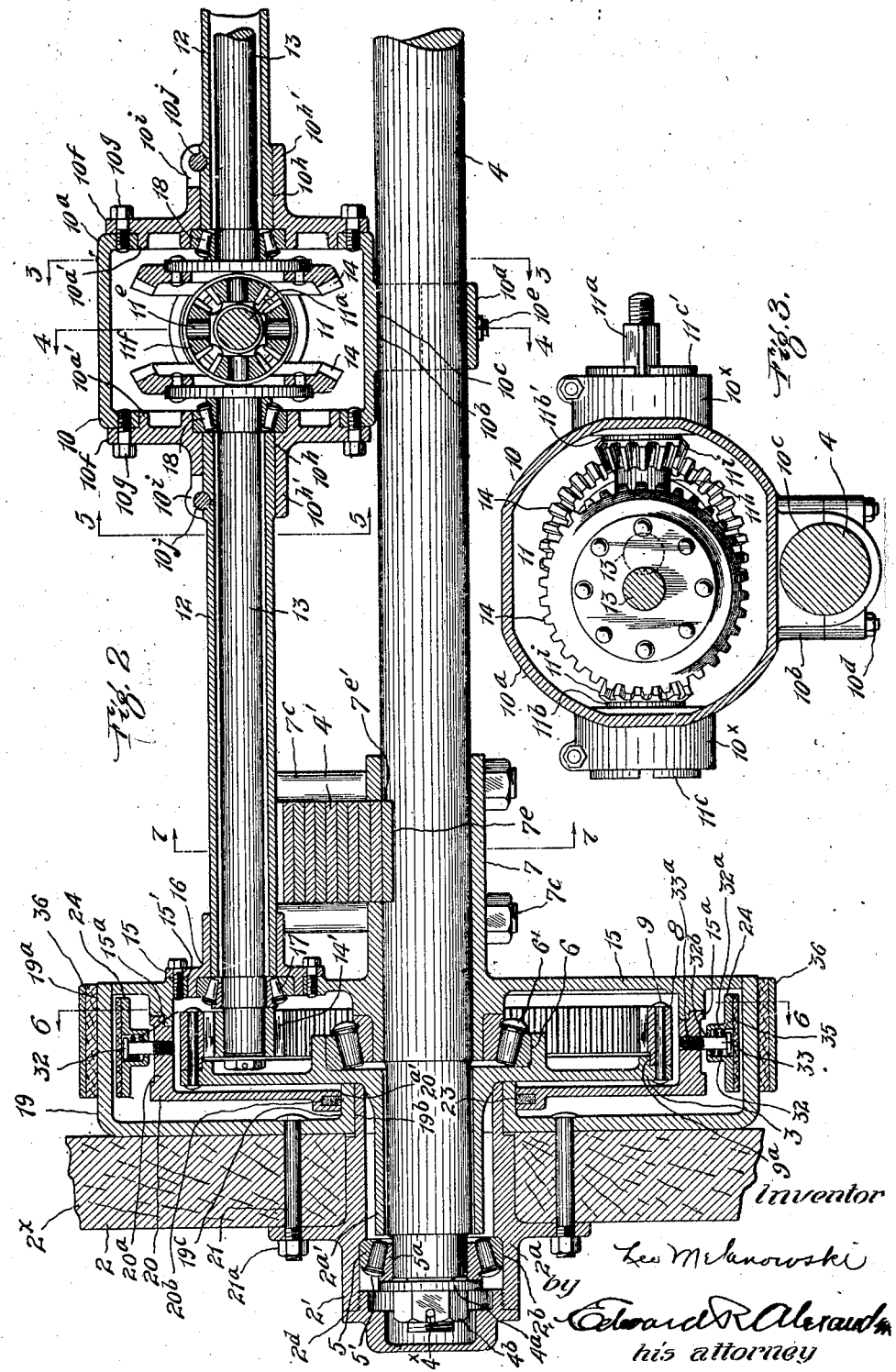

L. MELANOWSKI

MOTOR VEHICLE

Filed Jan. 5, 1920

Inventor
Leo Melanowski
by
Edward P. Alexander
his attorney

Patented Nov. 1, 1927.

1,647,974

UNITED STATES PATENT OFFICE.

LEO MELANOWSKI, OF CLEVELAND, OHIO, ASSIGNOR TO THE UNION TRUST COMPANY, OPERATING TRUSTEE, OF CLEVELAND, OHIO, A CORPORATION OF OHIO.

MOTOR VEHICLE.

Application filed January 5, 1920. Serial No. 349,488.

This invention relates to motor vehicles, more particularly to the power transmitting mechanism therefor.

One object of the invention is to provide an improved power transmitting mechanism capable of transmitting the power of the engine to the drive wheel or wheels of the vehicle effectively and economically.

Another object of the invention is to provide a power transmitting mechanism in which the proper speed reduction may be secured between the propeller shaft and the traction wheel or wheels to propel the vehicle positively and economically.

A further object of the invention is to simplify, in construction and arrangement, the elements constituting the power transmitting mechanism.

Another object of the invention is to enclose and protect certain of the power transmitting elements, to insure efficient operation, durability and proper lubrication thereof.

Another object of the invention is to transmit the driving power of the propeller shaft to the traction wheel or wheels through a shaft or shaft sections separate from the vehicle axle and to correlate the driving elements between the wheels and shaft sections with the braking elements for the wheel or wheels in a novel manner.

Another object of the invention is to so construct and correlate the elements constituting the differential and speed reducing mechanisms and the housing members therefor that adjustments, assembly and disassembly of such elements and members may be readily made.

Another object of the invention is to provide an improved hub the elements of which are of relatively simple construction and capable of easy assembly.

Other objects of the invention will be apparent to those skilled in the art to which my invention relates from the following description, taken in connection with the accompanying drawings.

For the purpose of illustration, I have, in the accompanying drawings shown and herein described one form of apparatus embodying my invention.

In the drawings, Fig. 1 is a fragmentary view, partly in section, showing a power transmitting mechanism embodying my invention.

Fig. 2 is a vertical sectional view of the parts shown in Fig. 1.

Fig. 3 is a section on the line 3—3 of Fig. 2.

Fig. 8 is a section on the line 8—8 of Fig. 1.

Figure 6:
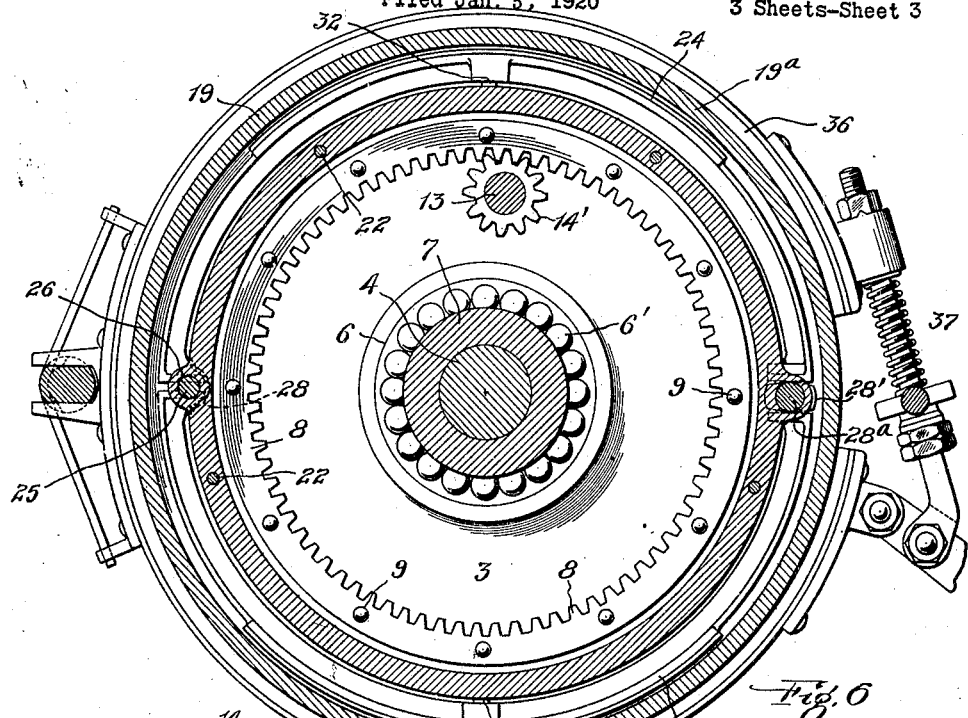
Fig. 6 is a section on the line 6—6 of Fig. 2.

In the drawings, 2 indicates as an entirety a portion of a rear wheel, only one being shown, mounted on an axle 4, in the manner to be later set forth. 4' indicates a spring arranged between the chassis (not shown) and the axle 4.

$2^a$ indicates the wheel hub. It preferably comprises a pair of telescoping members 2', $2^{a'}$, to the outer one of which the spokes $2^x$ are secured in any well known manner. The members 2', $2^{a'}$, are formed on their opposing walls with correspondingly shaped and spaced longitudinally extending ribs and grooves, whereby they may be telescoped rigidly together and locked against rotary movement, one relative to the other. 3 indicates an annular plate preferably formed integral with the inner end of the inner hub member $2^{a'}$. One purpose of this plate is to provide an abutment against which the inner end of the hub member 2' rests when the hub members 2', $2^{a'}$, are assembled. At $2^b$, the hub member 2' is formed with an annular recess to receive the outer race 5 of an anti-friction bearing 5'. The inner race $5^a$ of the bearing 5' is mounted on the outer end of the axle 4. At 6 the plate 3 is provided with an annular rib, concentric to the axis of the wheel 2, whereby is formed a seat for the outer race 6 of an anti-friction bearing 6'. 7 indicates a sleeve in which the axle 4 is supported. At its outer end, the sleeve 7 is formed with an annular recess which forms a seat for the inner race of the bearing 6. The bearings 5' and 6' are preferably of the tapered roller type and arranged so as to take all thrusts endwise of the axle 4 in either direction. The wheel hub $2^a$ is preferably removably held on the axle 4 by a washer $4^a$ and nut $4^b$, which has screw threaded connection with the outer or free end of the axle 4, engaging the inner race of the bearing 5'. This construction permits the bearings 5', 6' to be adjusted from time to time. The nut 4ᵇ may be locked in its adjusted position by suitable devices, such for example a cotter pin indicated at 4ˣ. 2ᵈ indicates a cap which may be secured to the outer end of the hub member 2' in any well known manner. The cap 2ᵈ serves to close in a dust proof and liquid tight manner the outer end of the hub 2ᵃ for well known reasons.

The sleeve 7 is provided at opposite sides with suitable integral supports 7ᵃ formed with openings 7ᵇ to receive bolts 7ᶜ or other suitable devices, to clamp the spring 4' to the sleeve 7. On its upper wall, and between the supports 7ᵃ, the sleeve is preferably cut away as shown at 7ᵈ, and the axle 4 is cut away on its upper surface below the cut-away 7ᵈ, to form a flat seat 7ᵉ for the spring 4' and side walls 7ᵉ' between which the spring fits. As a result of this construction, the spring 4' engages the seat 7ᵉ between the supports 7ᵃ and is clamped thereagainst by the devices 7ᶜ. When so clamped the spring 4' locks the sleeve 7 and axle 4 together and prevents relative movement therebetween about or endwise of the axle 4. It will therefore be seen that without the use of any clamping elements, other than those required to hold the spring 4' in position on the supports 7ᵃ and axle 4, I secure the sleeve 7 to the latter; in other words, I am enabled to so clamp the spring to the axle 4 that it serves to secure the sleeve in fixed position.

8 indicates a ring member carried by the plate 3. The ring member 8 is provided on its inner wall with gear teeth and forms one of the elements through which the power of the engine (not shown) is transmitted to the adjacent wheel of the vehicle. The ring gear 8 is preferably formed separately from the plate 3, but is secured to the inner face thereof, preferably adjacent its periphery, by a plurality of rivets 9. The plate 3 may be provided with an annular shoulder 9ᵃ to form a seat for the ring gear 8.

10 indicates a housing which encloses a differential mechanism, indicated as an entirety at 11, and certain of the power transmitting elements to be later described. The housing preferably comprises a substantially circumferential side wall 10ᵃ provided on its bottom with a pillow block 10ᵇ, having a semi-circular recess 10ᶜ, that is adapted to engage with and rest upon the axle 4. 10ᵈ indicates a yoke piece, fitting around the axle 4 and engaging at its opposite ends the pillow block 10ᵇ. 10ᵉ indicates bolts which extends through the yoke piece and into screw threaded openings formed in the pillow block 10ᵇ to detachably connect the housing 10 to the axle 4.

10ᶠ indicates end walls or plates for the housing 10. The end walls are of a shape to engage the circumferential edges of the side wall 10ᵃ. Each end wall is formed with an inwardly extending rib 10ᵃ' which engages and fits within the free edges of the wall 10ᵃ, the latter edges being preferably inturned as shown in Figs. 1 and 2, to form relatively wide engaging walls for the end walls or plates. The end walls or plates may be detachably secured to the inturned edges of the wall 10ᵃ by cap screws 10ᵍ. 10ʰ indicates an opening formed substantially centrally through each end plate 10ᶠ and adapted to receive the inner end of a tubular member 12. Preferably each end plate 10ᶠ is provided with a collar 10ʰ' to form a socket for the inner end of the tubular member 12. The collar 10ʰ' is preferably split, as shown at 10ⁱ and formed with aligned openings through which a bolt 10ʲ extends to clamp the collar to the adjacent end of the tubular member 12. The tubular members 12 extend laterally in opposite directions and enclose power transmitting shafts 13, which carry at their outer ends pinions 14' (only one being shown) which mesh with the gears 8 (see Figs. 2 and 3) to drive the wheels 2.

Of the differential mechanism 11, 11ᵃ indicates a driven shaft which is connected, by any suitable means, such as a universal joint, to the rear end of the propeller shaft (not shown).

Figure 4:
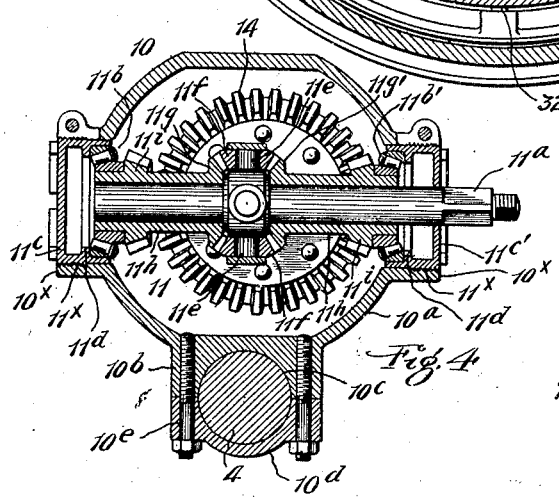
Fig. 4 is a section on the line 4—4 of Fig. 2.
Figure 5:
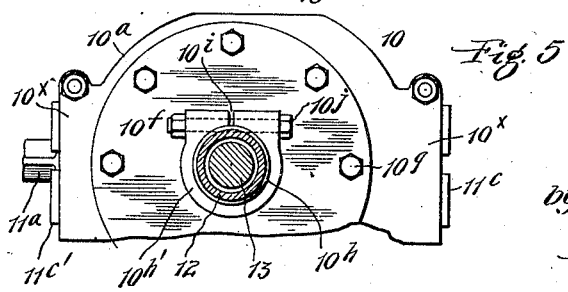
Fig. 5 is a section on the line 5—5 of Fig. 2.

11ᵇ, 11ᵇ', indicate anti-friction bearings arranged to support the front and rear ends of the driven shaft 11ᵃ. These bearings are preferably of the tapered roller type, the elements of which are oppositely disposed to take thrusts endwise of the shaft 11ᵃ in either direction. 11ᶜ, 11ᶜ' indicate supports for the anti-friction bearings 11ᵇ, 11ᵇ', respectively. These supports preferably comprise cap members removably and adjustably mounted in openings 11ˣ formed in the front and rear portions of the housing side wall 10ᵃ. The supporting members 11ᶜ, 11ᶜ', are preferably provided with screw threads and engage screw threads on the inner walls of the openings 11ˣ to permit the ready assembly, disassembly and adjustment of the bearings 11ᶜ, 11ᶜ' and shaft 11ᵃ. By preference, the side wall 10ᵃ is provided with tubular extensions or collars 10ˣ surrounding the openings 11ˣ therein. Each of these collars may be split and the walls of the split portion formed with aligned openings to receive a clamping bolt and nut (see Figs. 4 and 5), whereby the adjacent support 11ᶜ or 11ᶜ' can be fixed in its adjusted position. At 11ᵈ, each support 11ᶜ, 11ᶜ', is provided with an internal rib which forms a recess for the outer race of the adjacent bearing. 11ᵉ indicates a plurality of studs extending radially of the driven shaft 11ᵃ. These studs are preferably formed integrally with the driven shaft or a collar provided thereon.

11$^f$ indicates a plurality of beveled pinions loosely mounted on the studs 11$^e$. 11$^g$, 11$^{g'}$, indicate differential gears loosely mounted upon the driven shaft 11$^a$ and meshing with the beveled pinions 11$^f$. Each differential gear is provided with a laterally extending sleeve or hub 11$^h$ which is provided at its outer end with a pinion 11$^i$. As shown in Fig. 1, each gear 11$^g$, 11$^{g'}$, and the adjacent sleeve 11$^h$ and pinion 11$^i$ are preferably formed integrally and so constructed that the outer face of each pinion 11$^i$ forms an annular seat to receive the inner race of the adjacent bearing 11$^b$ or 11$^{b'}$.

Figure 7:
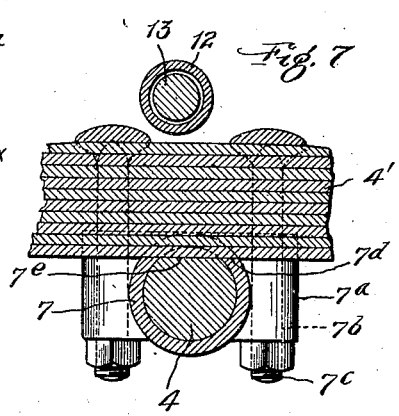
Fig. 7 is a section on the line 7—7 of Fig. 2.

14 indicates a gear mounted on the inner end of each shaft section 13. The gears 14 are in mesh with and driven by the pinions 11$^i$, to transmit the power of the engine to and through the differential to the shaft sections 13. As shown in the drawings, I prefer to make both pinions 11$^i$ and both gears 14 of the same size, respectively. When so constructed, the axes of the gears 14 are offset relatively, to each other so that each gear 14 may be driven without interference with the driving pinion 11$^i$ for the other gear 14. To provide for this arrangement, the shaft sections 13 are arranged equal distances from and on opposite sides of a plane extending at right angles to the axis of the shaft 11$^a$ and preferably cutting the axis of the shaft 4 and wheel 2, as will be understood by reference to Figs. 1, 6 and 7.

15 indicates a plate surrounding and preferably formed integrally with the sleeve 7. One function of this plate is to provide a support for the outer end of the tubular member 12 through which the adjacent shaft section 13 extends. For this purpose the plate 15 is formed with an opening 15' in which is removably mounted in any well known manner a collar 16 into which the outer end of the tubular member fits. As shown, the collars 10$^{b'}$ and 16 are formed with annular seats for anti-friction bearings 17, 18, in which the adjacent shaft section rotates. These bearings are preferably of the tapered roller type and oppositely disposed to take thrusts endwise of the shaft section in either direction.

19, 20, indicate a pair of spaced outer and inner cup-shaped members, the circumferential side walls of which—indicated at 19$^a$, 20$^a$, respectively—are arranged concentrically, relatively to each other and the axle 4. The side wall 19$^a$ of the member 19 may serve as a brake drum, in the usual manner, it being spaced from the side wall 20$^a$ of the member 20 to permit the use of brake shoes against both its inner and outer surfaces, as is usual in modern types of self-propelled vehicles.

The cup-shaped member 19 may be secured to the wheel or wheel-hub by any well known means, the means shown for illustrative purposes comprising a plurality of bolts 21 each extending through the adjacent wheel spoke and an opening in the outer flange of the wheel hub 2$^a$ and secured in position by a nut 21$^a$. Centrally, the cup-shaped member 19$^a$ is formed with an opening 19$^b$ adapted to snugly fit the outer cylindrical member 2' of the wheel hub 2$^a$. Surrounding the opening 19$^b$ is an inwardly extending flange 19$^c$, which extends through an opening 20$^{a'}$ formed in the member 20.

The cup shaped member 20 and plate 15 co-operate to form an enclosing chamber for the power transmitting elements 8 and 14'. For this purpose, the peripheral edge of the side wall 20$^a$ of the cup-shaped member 20 is secured to the plate 15. In order that the connections between these elements may be made tight to hold a lubricant, the plate 15 is provided with an inwardly extending rib 15$^a$. The free edge of the rib 15$^a$ has an annular shoulder which engages a correspondingly shaped shoulder on the side wall 20$^a$. The wall 20$^a$ and plate 15 may be secured together by a plurality of screws 22 (see Fig. 6). The wall of the cup-shaped member 20 surrounding the opening 20$^{a'}$ may be thickened and formed with a recess 20$^b$ to receive a gasket 23 to prevent leakage of the lubricant in the chamber formed by the member 20 and plate 15 from escaping.

24 indicates the brake shoes which operate upon the inner surface of the brake drum 19$^a$. The shoes 24 are preferably of substantially semi-circular shape. They are supported at adjacent ends upon a rod 25 which is mounted in aligned openings, 26, 27, formed in thickened walls of the rib 15$^a$ and side wall 20$^a$ of the cup-shaped member 20. Between these thickened walls is formed a recess 28 into which the adjacent ends of the shoes 24 extend to engage the rod 25 (see Fig. 1). The end walls of the recess 28 serve as stops to prevent movement of the shoes endwise of the shaft or rod 25. These walls therefore keep the shoes in proper position relative to the brake drum 19$^a$.

28' indicates a cam device which engages the free ends of the brake shoes 24 to operate them against the drum 19$^a$. The cam device 28' is fixed to a rock shaft 28$^a$ which is mounted in aligned bearing openings 29, 30, formed in side wall 20 and plate 15, respectively, diametrically opposite the openings 26, 27. The rock shaft 28$^a$ is extended laterally through the plate 15 and carries at its outer end an arm 31 by means of which the shaft 28$^a$ may be operated.

32 indicates as an entirety means for maintaining each brake shoe in retracted position. Of these means 32$^a$ indicates a socket preferably formed integrally with the adjacent shoe. 32$^b$ indicates an opening formed in the bottom wall of the socket 32$^a$. 33 indicates a bolt disposed centrally of the socket 32ª, extending through the opening 32ᵇ and having screw thread connection at its free end with a screw threaded opening 33ª formed in the wall 20ª. 35 indicates a coiled spring surrounding the bolt 33 and disposed between its head and the bottom wall of the socket 32ª.

36 indicates the brake shoes which engage the external surface of the drum. The shoes 36 are operated and released in a well known manner by the devices indicated as an entirety at 37.

From the foregoing description it will be seen that I have provided a power transmitting mechanism wherein the power is transmitted through shafts or shaft sections other than the shaft upon which the wheels rotate and which carries the load. At the same time I have transmitted the power directly to the wheel hubs and provided a double reduction of speed, thus utilizing in an effective manner the power of the engine to drive the vehicle. It will also be seen that the driven elements between the shafts 13 and hubs 2ª comprise spur gears and that the gears fixed to the hubs are of the internal gear type; furthermore, these latter gears may be readily and economically replaced by new ones when necessary.

Another advantage incident to my invention results in the arrangement of the gears which are connected to the wheel hubs. As shown, these gears are disposed within and concentric to the brake drum. As a result of this construction I am enabled to correlate my power transmitting mechanism with standard as well as preferred types of brake mechanisms, and at the same time provide an enclosure for the driving elements, whereby the latter may be protected against dust and the elements and efficiently lubricated.

From the foregoing description it will further be seen that I provide an enclosing casing for the power transmitting elements adjacent each wheel hub. This casing not only keeps out dirt and other foreign matters but being liquid tight, it may be filled with a lubricant in which the elements run without danger of injury or undue wear. This construction is also advantageous because it permits the provision of an internal brake mechanism in a relatively simple manner. This correlation of elements also permits me to amply protect the internal brake shoes and the braking surfaces therefor by extending the inner wall of the chamber for the power transmitting elements outwardly sufficiently to fit close against or within the side wall 19ª.

When so constructed, it will be seen that the internal brake mechanism is enclosed within a substantially dust proof chamber (see Figs. 1 and 2). My improved differential mechanism is relatively simple in that its elements are mounted on the driven member. This member being arranged in the plane of the shaft sections makes it possible to connect the differential gears direct with the shaft sections. As the driven member is mounted in removable bearings at its opposite ends at opposite sides of the differential housing and the openings therein for the bearings are of greater diameter than the gears and pinions and other elements of the differential mechanism, it will be understood that all of these elements can be readily assembled and removed.

To those skilled in the art to which this invention relates many alterations in construction and widely differing embodiments and applications of my invention will suggest themselves without departing from the spirit and scope thereof. My disclosures and description herein are purely illustrative and are not intended to be in any sense limiting.

What I claim is:

1. In apparatus of the class described, the combination with an axle, of a wheel rotatably mounted on said axle, a gear fixed to the hub of said wheel, a shaft section carrying a pinion meshing with said gear, a casing enclosing said gear and pinion and formed with an opening through which the shaft section extends and having inwardly and outwardly extending, axially disposed bosses, and a bearing for the hub of said wheel on said outwardly extending boss, the inwardly extending boss serving as a spring support.

2. In apparatus of the class described, the combination with an axle, of a wheel rotatably mounted on said axle, a gear fixed to the hub of said wheel, a shaft section carrying a pinion meshing with said gear, a plate fixed to said axle having an axially disposed outwardly extending boss, and a casing member surrounding said gear secured to said plate and co-operating therewith to enclose said gear and pinion and a bearing on said boss for the hub of said wheel.

3. In apparatus of the class described, the combination with an axle, of a wheel rotatably mounted thereon, a gear fixed to the hub of said wheel, a power driven shaft section provided with a pinion meshing with said gear, a pair of cup-shaped members the side walls of which surround and are arranged concentric to the axis of said gear, a brake mechanism associated with the side wall of said inner member and arranged to act against the inner surface of the side wall of said outer member, and a plate co-operating with the side wall of the inner member to enclose said gear and pinion.

4. In apparatus of the class described, the combination with an axle, of a wheel rotatably mounted thereon, a gear fixed to the hub of said wheel, a power driven shaft section provided with a pinion meshing with said gear, a pair of cup-shaped members the side walls of which surround and are arranged concentric to the axis of said gear, a brake mechanism arranged to act upon the inner surface of the side wall of said outer member, a plate co-operating with the side wall of the inner member to enclose said gear and pinion and means for actuating said brake mechanism mounted in said inner cup shaped member and said plate.

5. In apparatus of the class described, the combination with an axle, of a wheel rotatably mounted thereon, a gear fixed to the hub of said wheel, a power driven shaft section provided with a pinion meshing with said gear, a pair of cup-shaped members the side walls of which surround and are arranged concentric to the axis of said gear, a brake mechanism arranged to act upon the inner surface of the side wall of said outer member, and a plate co-operating with the side wall of the inner member to enclose said gear and pinion and with the side wall of the outer member to enclose the braking surfaces of said brake mechanism.

6. In apparatus of the class described, the combination with an axle, of a wheel rotatably mounted thereon, a gear fixed to the hub of said wheel, a power driven shaft section provided with a pinion meshing with said gear, a pair of cup-shaped members the side walls of which surround and are arranged concentric to the axis of said gear, a brake mechanism associated with the side wall of said outer member, and a plate co-operating with the side wall of the inner member to enclose said gear and pinion and means for normally maintaining said brake shoes in a retracted position, one element of said means being connected to said inner member.

7. In apparatus of the class described, the combination with an axle, of a wheel rotatably mounted thereon, a gear fixed to the hub of said wheel, a power driven shaft section provided with a pinion meshing with said gear, a pair of cup-shaped members the side walls of which surround and are arranged concentric to the axis of said gear, a brake mechanism associated with the side wall of said outer member, a plate co-operating with the side wall of said inner member to enclose said gear and pinion, and liquid tight connections between the bottom wall of said inner member and a flange on said outer cup shaped member.

8. In apparatus of the class described, the combination with an axle, of a wheel rotatably mounted thereon, a gear fixed to the hub of said wheel, a power driven shaft section provided with a pinion meshing with said gear, a pair of cup-shaped members the side walls of which surround and are arranged concentric to the axis of said gear, a plate co-operating with the side wall of said inner member to enclose said gear and pinion, and brake mechanisms associated with the inner and outer surfaces of the side wall of said outer member, that for the inner surface being supported from the inner of said cup shaped members.

9. In apparatus of the class described, the combination with an axle, of a wheel rotatably mounted thereon of outer, inner and intermediate cup-shaped members the side walls of which are arranged concentric to the axis of said axle, the side wall of the inner member being provided with gear teeth, means for connecting the outer and inner members to said wheel, a shaft section provided with a pinion meshing with said gear teeth, a brake mechanism arranged to act against the inner surface of the side wall of said outer member and supported on said intermediate member, and a plate through which said shaft section extends, co-operating with the side walls of said outer and intermediate members to form chambers enclosing said gear teeth and pinions and said brake mechanism.

In testimony whereof I affix my signature.

LEO MELANOWSKI.